United States Patent
Wilkinson et al.

(10) Patent No.: US 11,328,353 B1
(45) Date of Patent: May 10, 2022

(54) SYSTEM AND METHOD FOR PERSONALIZED VIDEOS

(71) Applicant: United Services Automobile Association (USAA), San Antonio, TX (US)

(72) Inventors: Carlos Winston Wilkinson, San Antonio, TX (US); Scott Nathan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 874 days.

(21) Appl. No.: 15/345,147

(22) Filed: Nov. 7, 2016

(51) Int. Cl.
*G11B 27/02* (2006.01)
*G06F 3/04842* (2022.01)
*G06Q 30/04* (2012.01)
*G06Q 40/02* (2012.01)

(52) U.S. Cl.
CPC ....... *G06Q 40/025* (2013.01); *G06F 3/04842* (2013.01); *G06Q 30/04* (2013.01); *G11B 27/02* (2013.01)

(58) Field of Classification Search
CPC ...... G06Q 40/025; G06Q 30/04; G06Q 50/16; G11B 27/02; G06F 3/04842
See application file for complete search history.

(56) References Cited

U.S. PATENT DOCUMENTS

| | | | | |
|---|---|---|---|---|
| 8,433,650 | B1* | 4/2013 | Thomas | G06Q 40/02 705/38 |
| 8,527,402 | B2* | 9/2013 | McDonald | G06Q 50/16 705/38 |
| 9,253,251 | B2* | 2/2016 | Jackson | H04L 67/10 |
| 10,026,121 | B1* | 7/2018 | Burks | G06Q 30/04 |
| 10,269,064 | B1* | 4/2019 | Burks | G06Q 40/025 |
| 10,475,119 | B1* | 11/2019 | Kissner | G06Q 40/025 |
| 10,552,819 | B1* | 2/2020 | Gupta | G06Q 20/3272 |
| 10,706,457 | B2* | 7/2020 | Damy | G06Q 30/0621 |
| 10,743,046 | B1* | 8/2020 | Sahni | G06Q 30/0643 |
| 10,846,792 | B1* | 11/2020 | Wilkinson | G06Q 40/025 |
| 2011/0261144 | A1* | 10/2011 | Benefield | H04L 12/1827 348/14.08 |
| 2011/0295662 | A1* | 12/2011 | Harris | G06Q 20/10 705/14.4 |

(Continued)

OTHER PUBLICATIONS

"https://www.personicom.com/portfolio/interactive-personalized-video-bill-universal-power-light/", Mar. 20, 2016 PersoniCom | Personalized Interactive Video. (Year: 2016).*

(Continued)

*Primary Examiner* — Abdulmajeed Aziz
*Assistant Examiner* — Tony P Kanaan
(74) *Attorney, Agent, or Firm* — Fish & Richardson P.C.

(57) ABSTRACT

Methods, systems, and apparatus, including computer programs encoded on computer storage media, to present a video. One of the methods includes obtaining loan transfer information for a user. The method includes selecting non-personalized content, at least some of the non-personalized content selected based on the loan transfer information. The method includes generating a user specific video using the loan transfer information and the selected non-personalized content. The method also includes providing the user specific video to the user.

15 Claims, 5 Drawing Sheets

(56) References Cited

U.S. PATENT DOCUMENTS

| | | | |
|---|---|---|---|
| 2013/0016173 A1* | 1/2013 | Johnson | G06Q 20/18 348/14.03 |
| 2015/0106225 A1* | 4/2015 | Glass | G06Q 30/0641 705/26.7 |
| 2015/0262292 A1* | 9/2015 | Corr | G06F 3/04842 705/38 |
| 2015/0356526 A1* | 12/2015 | Christmas | G06Q 40/02 705/43 |
| 2016/0026249 A1* | 1/2016 | Glass | G06F 3/016 715/702 |
| 2016/0140654 A1* | 5/2016 | Bhat | G06Q 10/06316 705/7.26 |
| 2017/0026613 A1* | 1/2017 | Lee | G06Q 10/06398 |
| 2017/0287024 A1* | 10/2017 | Bakun | H04L 51/10 |
| 2018/0048864 A1* | 2/2018 | Taylor | G06F 3/1446 |
| 2018/0068385 A1* | 3/2018 | Ruebush | G06Q 40/025 |
| 2019/0050634 A1* | 2/2019 | Nerayoff | G06K 9/6201 |

OTHER PUBLICATIONS

"http://whattheythink.com/articles/64334-t-uses-personalized-video-explain-mobile-bills/", Market Intelligence for Printing and Publishing, AT&T Uses Personalized Video to Explain Mobile Bills, By Cary Sherburne, Published: Jul. 12, 2013 (Year: 2013).*

"http://whattheythink.com/articles/64334-t-uses-personalized-video-explain-mobile-bills/", Market Intelligence for Printing and Publishing, AT&T Uses Personalized Video to Explain Mobile Bills, By Cary Sherburne, Published: Jul. 12, 2013 (Year: 2013)13 (Year: 2013).*

"https://www.personicom.com/portfolio/interactive-personalized-video-bill-universal-power-light/", Mar. 20, 2016 PersoniCom | Personalized Interactive Video. (Year: 2016) (Year: 2016).*

* cited by examiner

SYSTEM AND METHOD FOR PERSONALIZED VIDEOS

BACKGROUND

Loan servicing is the process by which a company (mortgage bank, servicing firm, etc.) collects interest, principal and escrow payments from a borrower (also referred to as 'user' in this specification). Under some circumstances the entity servicing a loan may change. For example, the master servicer may choose to have another entity service the loans on its behalf or the master servicer may choose to sell the servicing rights to another entity. When the loan servicing provider changes, details about how a borrower provides payment to the loan servicer and other key information for borrowers will also change.

In other circumstances the actual ownership of the loan can be sold or transferred to a new entity. In such circumstances the entity servicing the loan may or may not change.

Throughout this specification the term 'loan transfer' is intended to apply to circumstances when the servicing of the loan is transferred to a new entity and/or when the ownership of the loan is transferred.

SUMMARY

In general, one innovative aspect of the subject matter described in this specification can be embodied in methods that include the act of obtaining loan transfer information for a user. The methods include the act of selecting non-personalized content, at least some of the non-personalized content selected based on the loan transfer information. The methods include the act of generating a user specific video using the loan transfer information and the selected non-personalized content. The methods also include the act of providing the user specific video to the user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The loan transfer information may be associated with a welcome letter. Generating the user specific video may include generating a plurality of scenes, each scene combining at least some non-personalized content with at least some personalized content. The methods may include the act of selecting a plurality of scenes to generate based on at least one of information requested by the user and a profile of the user. The methods may include the act of generating a scene is response to determining the user is delinquent on their mortgage payments. At least one scene may include a call to action.

BRIEF DESCRIPTION OF THE DRAWINGS

Like reference numbers and designations in the various drawings indicate like elements.

DETAILED DESCRIPTION

A mortgage is generally the largest financial loan that an individual takes on.

When a loan is sold or the service of the loan is transferred to another servicing agent a borrower may have questions. The practice of selling the loan or transferring the servicing of your loan is common in some industries (such as mortgages). While a loan can be sold or the servicing of a loan can be transferred without the permission of a borrower, the borrow needs to be notified. Borrowers will have some information about the transfer that they need to know (for example, changes to the payment address).

By law, when the servicing of a loan is transferred, the retiring servicer is required to provide the borrower with a goodbye letter and the new servicer is required to provide the borrower with a welcome letter. The goodbye and welcome letter state, among other items, who the new servicing company is, where it is located, how to contact the servicing company, and where and when the next payment should be sent. Similarly, when ownership of a loan is transferred, the borrower is provided notices with certain information such as the new owner of the loan.

The goodbye and welcome letters are required to contain several regulatory required notices that can be confusing and, accordingly, despite these letters borrowers frequently have questions about the transfer process. One method of answering some of these questions is to generate a dynamic video that explains the details of the user's particular situation.

Figure 1:
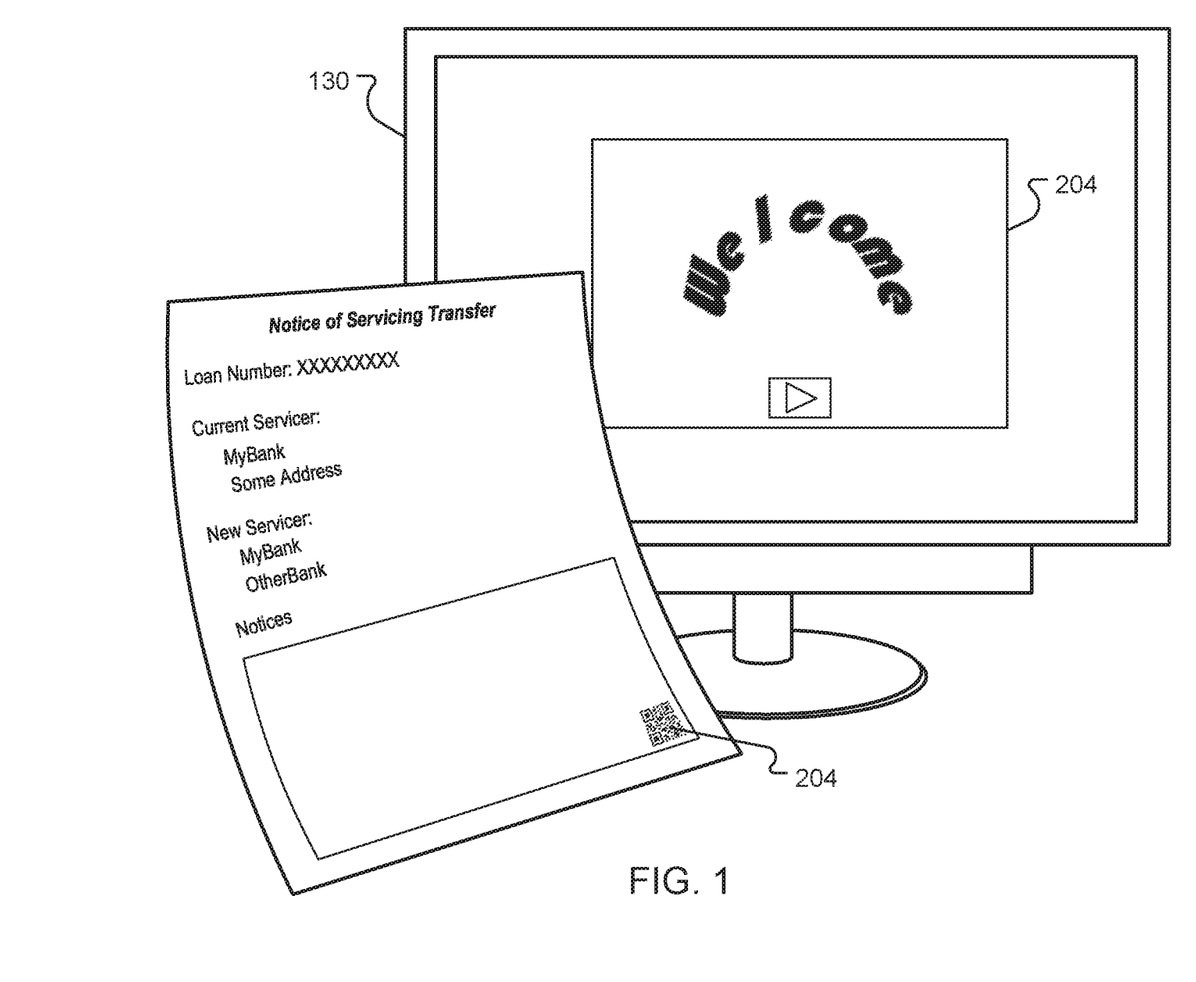
FIG. 1 illustrates an example of a dynamic video which explains a change in loan servicing.

FIG. 1 illustrates an example of a dynamic video 100 which explains a transfer of as described in the goodbye and/or welcome letter 102. As described above, the goodbye/welcome letter 102 alert a borrower to a change in the ownership/servicing arrangement of a loan. The goodbye letter may provide the borrower with an indication of a location where the user can view a personalized video about the change in servicing or the loan transfer.

The video may be generated at the time the video is requested by the user and may include specific details about the transfer of servicing or loan transfer. The details can include, but are not limited to:

Current Principal and/or Escrow Balance—the current balance may include a principal balance, which reflects and amount owed to the lender, and an escrow balance, or the amount that the lender is holding on behalf of the borrower. Generally, an escrow account is used to hold funds on behalf of the borrower to pay for predetermined expenses associated with the subject of the loan. Examples of the services include taxes and insurance.

Transfer date—the date the transfer of servicing or sale of the loan will be finalized.

New payment due date—the day of the month that they payment is due to the new service provider (for example, the $1^{st}$, the $15^{th}$, etc.).

First payment date—The day first payment is due (for example, Oct. 1, 2017).

Total Payment Amount—the total amount paid over the life of the loan.

Payment amount—The total amount due for each payment.

Principal Payment Amount—The amount of the first payment applied to the principal.

Interest Payment Amount—The amount of the first payment applied to interest.

Escrow payment amount—The amount of the first payment applied to escrow.

Coupon/Bill status—Whether the user can expect to receive coupons or bills. In general, a coupon is a set of preprinted payment stubs that a mortgage broker provides to the mortgage borrower. Each stub in the coupon book indicates the due date, account number and the amount due. The borrower detaches the stub and sends it, along with payment, during each payment period. In contrast, bills are delivered to the customer on a periodic basis.

Availability to Direct Debit/Transfer of Direct Debit— Indicates is the new service provider offers direct debit services and whether the direct debit information can be transfers from one service provider to another.

Payment term—The amount of time remaining on the loan.

Additionally, the video may indicate whether the user is current on all of their payment obligations. If the user is not current, the video may direct the user to contact a particular individual and may present tips and other educational information to help the user maintain good standing in their mortgage, as well as outline potential risks associated with not paying the mortgage.

The video may also include a call to action, for example, the video may provide contact information where a user who is not current on their payment obligations can speak to a point of contact to arrange for a repayment schedule.

In some implementations, the goodbye and/or welcome letter 102 may include a Uniform Resource Locator (URL) that the user may visit in order to view the video. In some implementations, the goodbye letter 102 may include a bar code, QR code, or some other machine readable identifier that may cause a browser of a device that reads the identifier to navigate to the personalized video. In some implementations, a device may be able to identify the goodbye and/or welcome letter based on other information. For example, the device may be capable of identifying a document based on object character recognition or other similar techniques.

Figure 2:
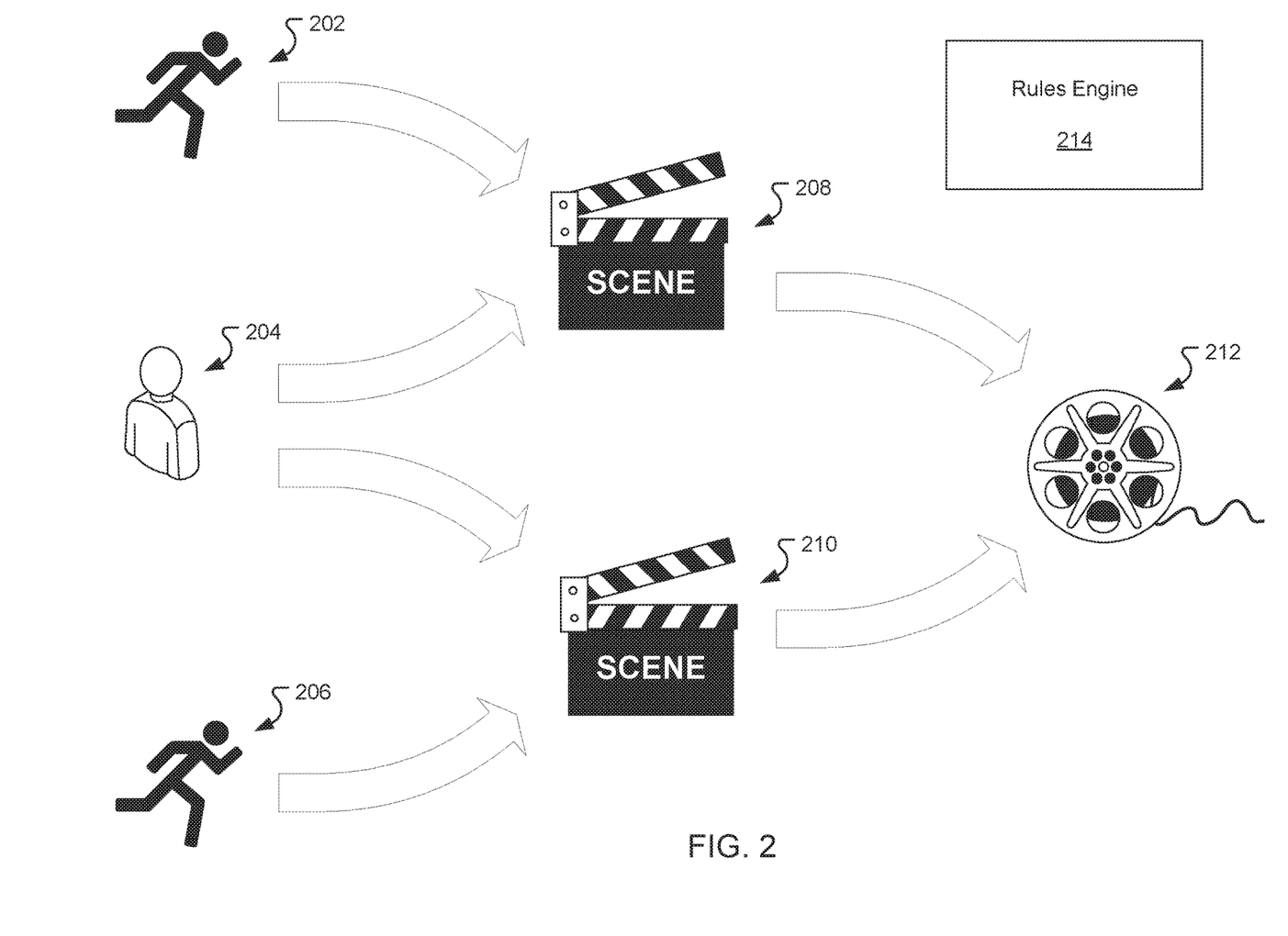
FIG. 2 illustrates an example of generating a customized video for a particular individual.

FIG. 2 illustrates an example of generating a customized video for a particular individual. A complete video is made up of one or more scenes. Each scene can include pre-rendered non-personalized creative content (that is, content that does not change) and custom generated content that is generated based on information about the subject of the video. A scene is the smallest component of the video. The transition between scenes may include a visual indicator in the video, such as a cut. The transition between scenes may also be transparent to the viewer of the video, two scenes may be set up to flow seamlessly from one into the other. So that a user viewing the video may not be able to identify where one scene ends and another begins.

In this example, non-personalized creative content 202 is combined with personal settlement information 204 to generate a scene 208. The non-personalized creative content may include any audio or visual content. For example, the non-personalized creative content may be a voiceover describing the meaning of "First Payment Date." The First Payment Date displayed may be the user's first payment date. The combined scene may include the voice over describing first payment date while the video content shows and highlights the first payment date of the goodbye or welcome letter.

Additional non-personalized creative content 206 can be combined with the personal settlement information 204 to generate a scene 210. For example, the non-personalized creative content 206 can explain interest payment amount. The personal settlement information may be, for example, a display of the amount of the interest owed by the borrower.

In some implementations, the customer content may include a voice over. The voice over may be generated by connecting different pieces of prerecorded audio. For example, the system may have a recording of an individual reciting different numbers and units. The system can combine different portions of pre-recorded audio to generate a seamless recitation of the content. In other implementations, custom audio content may be generated using automation.

The video can be further customized based on a user profile. For example, an organization generating the video may have a record that indicates the user prefers to be referred to using a nick name. The rules engine may then cause the customer video to refer to the user using their preferred name.

In some implementations, a rules engine 214 may combine the personalized and non-personalized content based on information provided in a user's records or based on information included in the request to view the document. In some implementations, the rules may divide the scenes into mandatory and conditional scenes. Mandatory scenes are displayed without regard to the either the user record or the request. For example, the rules engine may have a rule that requires that a new payment due date be included in each video.

Optional scenes, may be included or not depending on the user record or request information. For example, by default, the rules engine may not include scenes that describe the principal payment amount, the interest payment amount, or the escrow payment amount. However, the user may request a video that includes this information. Alternatively, the system may detect that the user typically wishes to view a detailed personalized video. Based on this information, the rules engine may customize the video, including more or fewer scenes. For example, if the user typically requests personalized videos that include a large amount of detail, the rules engine may generate a complete personalized video that fully explains each feature of the goodbye and/or welcome letter.

In some implementations, the video is regenerated each time the video is requested. Accordingly, using a rule system to select the scenes that the user is likely to wish to see based on the rules engine 214 allows for the overall performance of the video generation system to be improved. For example, it takes time and CPU cycles to render a video for display. The more scenes that need to be included, the longer the render time and the more memory and processing resources are necessarily used to create the video. Therefore, by using the rules system described herein to reduce the number of scenes included in the video, the overall performance of the computer system is improved.

Figure 3:
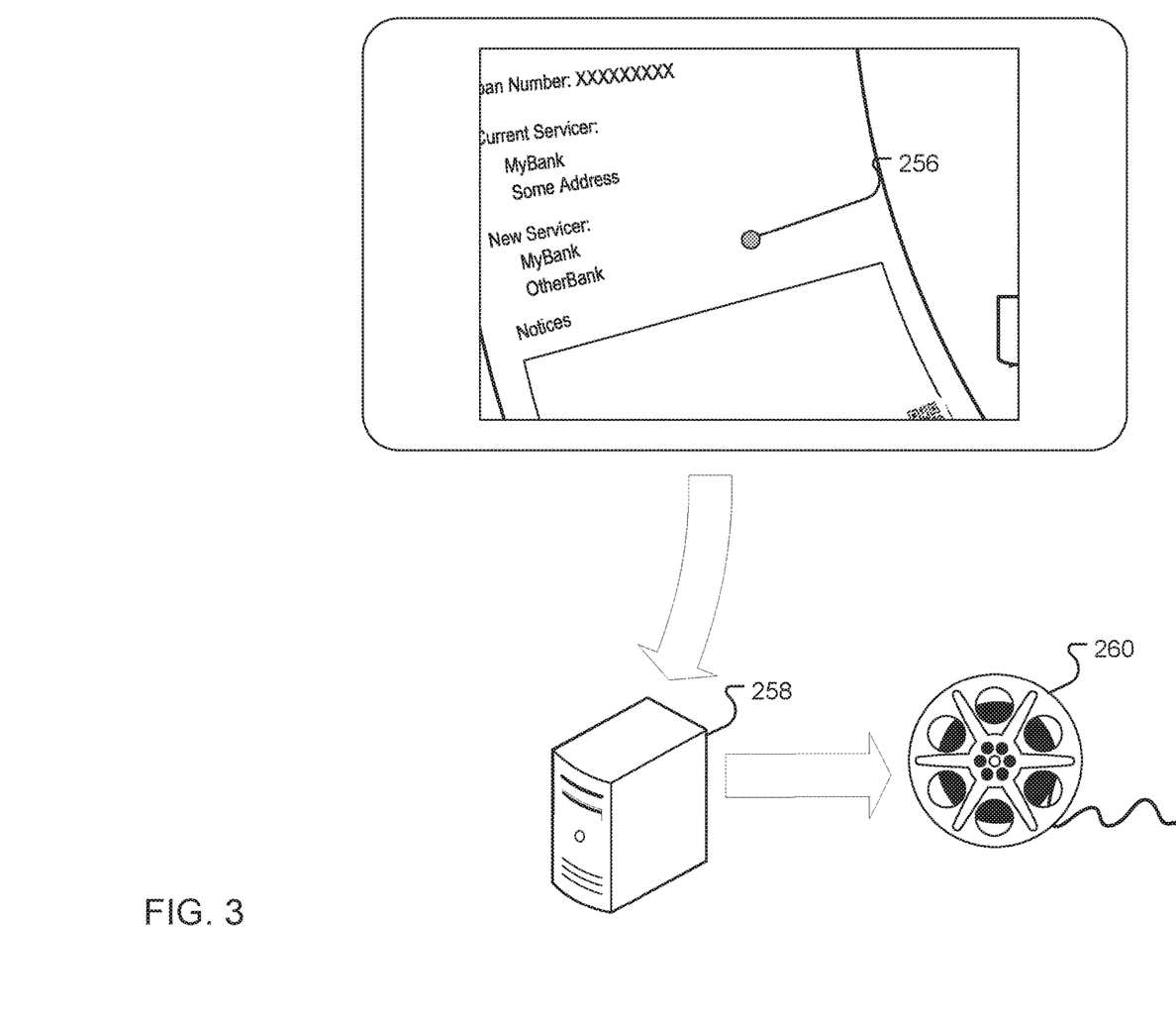
FIG. 3 illustrates an example of generating videos based on other areas of the settlement document.

Referring to FIG. 3, in some implementations, videos 260 on less common optional topics may be generated based on user interest. For example, a user may request that a particular portion of the goodbye/welcome letter be explained. A system 258 may generate a video 260 on the topic on demand. The user may identify the portion of the goodbye and/or welcome letter by, for example, clicking on selecting a line of an on-line letter.

The user may use the camera on their phone 254 or other portable device to identify a portion of a printed goodbye and/or welcome letter 252 that they would like explained. For example, an augmented reality application may put a marker 256 on the camera image, such as a dot or crosshair. The user points the camera such that the requested line or section (e.g. the dot or cross hair are on the line or section) and the user may take a picture or otherwise indicate that the image is correctly aligned. The system 258 can analyze the picture to determine which line or section the user is requesting and generate a video 260 based on the determined line or section. The system may additionally generate a descriptive image overlay 262 in real-time within the camera display that provides additional context to the selected section.

Figure 4:
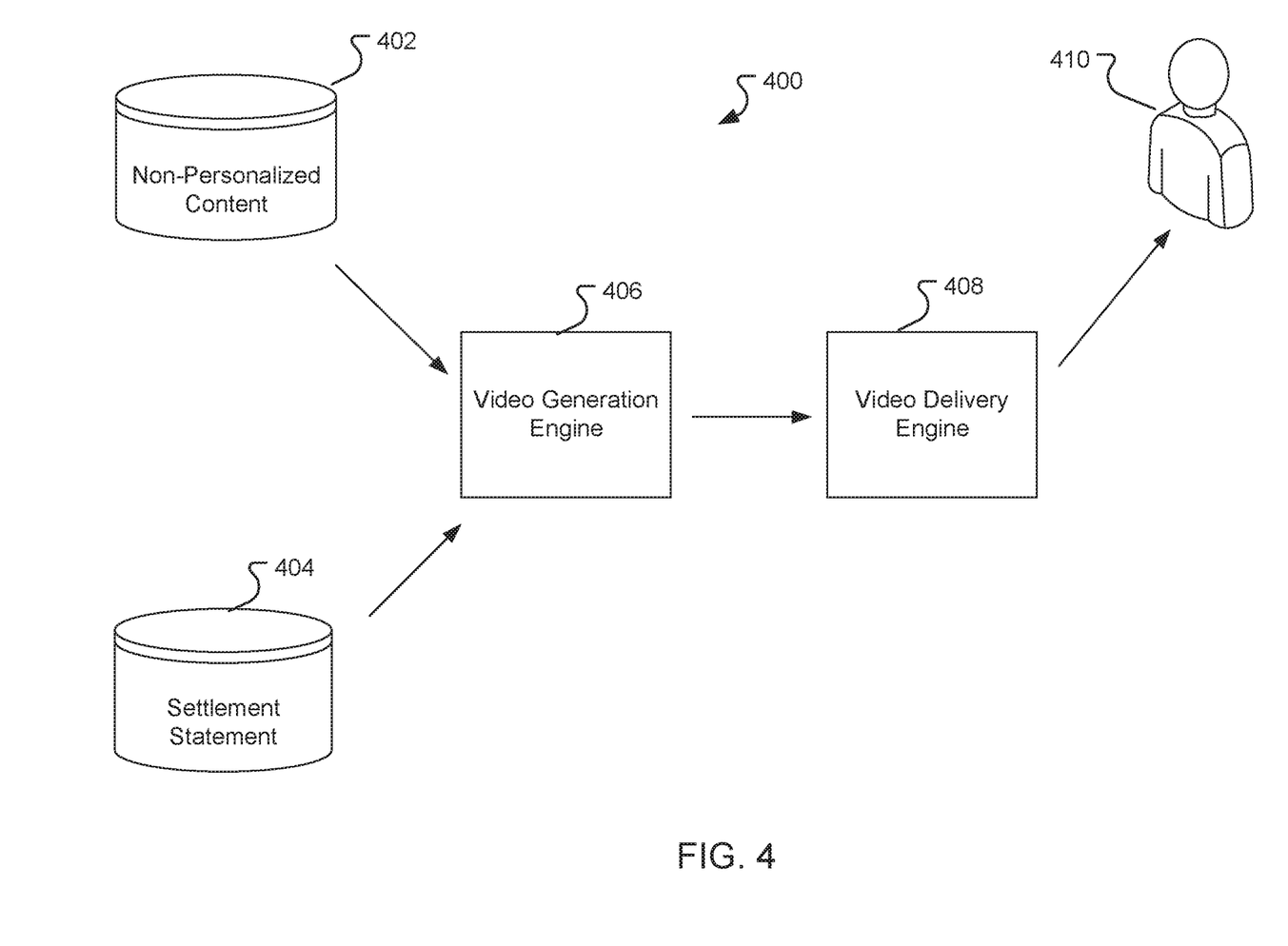
FIG. 4 illustrates an example system for generating a customized video.

FIG. 4 illustrates an example system 400 for generating a customized video. A non-personalized creative content data store 402 stores non-personalized creative content, that is, content that is not change based on the content of the goodbye and/or welcome letter. Non-personalized creative content can include, for example, images, movie clips, sound clips. The non-personalized creative content data store 402 may be, for example, a relational database, a file system, an object database, or any other system that enables content to be stored and organized for later access.

The loan transfer data store 404 may store the? content of the goodbye and/or welcome letter information for one or more users. The loan transfer data store 404 may store the content of the settlement statement organized in a database or other information retrieval system. The loan transfer data store 404 may also store a digital copy of the goodbye and/or welcome letter itself, or a spreadsheet representation of the goodbye and/or welcome letter.

The video generation engine 406 can accept the information from the loan transfer data store 404 and the non-personalized content and generate a personalized video that explains a goodbye and/or welcome letter for an individual.

The video generation engine 406 can make the video available to a video delivery engine 408. The video delivery engine 408 can be a webserver that provides the video in conjunction with a web page. In some implementations, the video delivery engine 408 can provide the video to a user 410 in an e-mail, message, or through another medium. Once received, the user can view the personalized video which includes the details of the individuals goodbye and/or welcome letter, including video representations of values included in the settlement statement.

Figure 5:
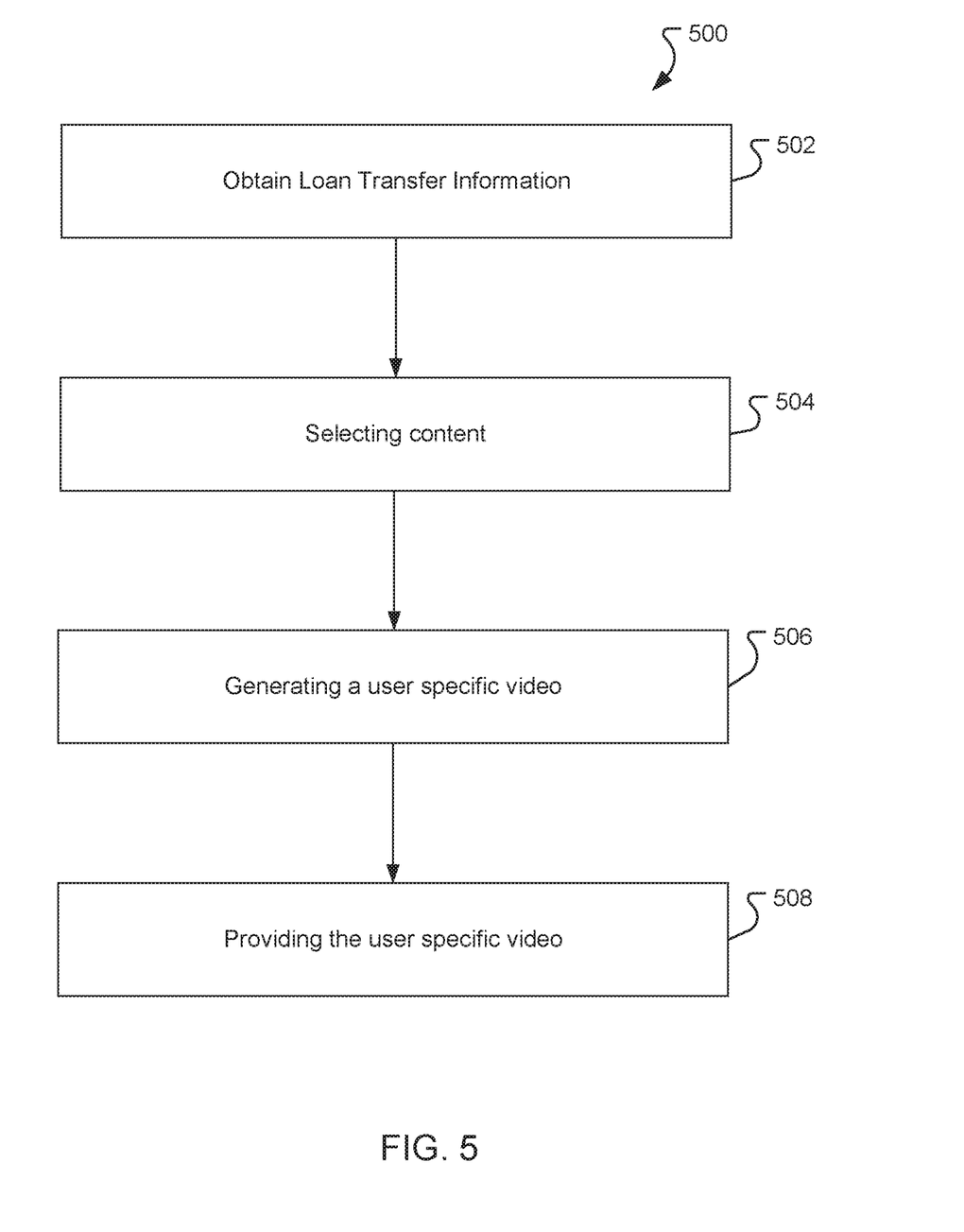
FIG. 5 is a flow chart of an example process for generating a personalized video.

FIG. 5 is a flow chart of an example process 500 for generating a personalized video. The process can be performed by a computer system executing the process. The computer system may include, for example, a rules engine (such as the rules engine 214).

The process 500 obtains 502 loan transfer information for a user. A user may request a personalized video describing the loan transfer information. For example, the user may receive a goodbye or welcome letter that includes a URL, a barcode, or a QR code that can cause a web browser connected to the Internet to request a personalized video from a server. In some implementations, the request for the video may be provided by an application executing on a mobile device. The request may include, for example, a picture of the goodbye or welcome letter. In some implementations, the picture may include an indication of an area of particular interest to the user. When the server receives the request, the server may obtain loan transfer information for the user. The loan transfer information may be obtained in a persistent data store, such as a database. In some implementations, the request for the personalized video may contain additional information, such as an indication of an area particular interest.

The process 500 selects 504 content, at least some of the content selected based on the loan transfer information. In some implementations, the content may be selected based on information included in the request and/or information stored in a user profile. The content may include non-personalized content. For example, the request may indicate a topic of particular interest to the user. Alternatively, a user's preferences for shorter or longer videos may be stored in a user profile.

The process 500 generates 506 a user specific video using the loan transfer information and the selected content. The process 500 may collect the loan transfer information and the selected content. Non-personalized content may be combined with the loan transfer information to create a personalized scene. Multiple scenes may be combined together to create the video. In some implementations, at least one of the scenes may include a call to action. In general, a call to action an instruction to the user to provoke an immediate response. For example, a user who is delinquent on mortgage payments may be instructed to reach out to a point of contact. In some implementations, the call to action may instruct the user to be on the lookout for their first bill or a book of payment coupons provided by the new servicer.

The process 500 provides 508 the user specific video to the user. The video may be displayed on the user's device. For example, the video may be displayed within a web browser.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
obtaining, by a computer system, loan transfer information of a user, the loan transfer information comprising a document specifying a loan transfer particular to the user;
causing, by a computer system, a display of an augmented reality interface on a user device of the user, the augmented reality interface including a graphical marker for aligning the document with respect to a camera of the user device;
receiving, by the computer system from the user device, a request for a user specific video that explains the loan transfer, wherein the request comprises a computer image of the document captured by the camera of the user device using the augmented reality interface;
in response to receiving the request, generating, by the computer system using a rules engine, the user specific video, including:
selecting non-personalized content from a data store, at least some of the non-personalized content selected based on the loan transfer information;
analyzing the computer image of the document to determine at least a portion of the document coinciding with the graphical marker on the augmented reality interface;
generating personalized content based at least on the analysis of the computer image;
combining, to generate a plurality of scenes, the selected non-personalized content and the personalized content including generating at least one mandatory scene and generating at least one conditional scene that explains the portion of the document coinciding with the graphical marker on the augmented reality interface; and
generating the user specific video including the plurality of scenes;
causing, by the computer system, a display of the document in real-time on the user device using the augmented reality interface, the display of the document including an image overlay comprising contextual information regarding the portion of the document coinciding with the graphical marker on the augmented reality interface; and
providing, by the computer system, the user specific video to the user including causing a display of the user specified video on the user device.

2. The computer-implemented method of claim 1, wherein the document comprises at least one of a goodbye letter or a welcome letter.

3. The computer-implemented method of claim 1, wherein the generating of the at least one mandatory scene comprises generating a plurality of mandatory scenes, each scene combining at least some non-personalized content with at least some personalized content.

4. The computer-implemented method of claim 3, wherein the at least one mandatory scene of the plurality of mandatory scenes is generated based on a determination that the user is delinquent on their mortgage payments.

5. The computer-implemented method of claim 3, wherein at least one mandatory scene of the plurality of mandatory scenes comprises a call to action.

6. A system comprising:
one or more processors; and
one or more non-transitory computer storage medium encoded with computer program instructions that when executed by the one or more processors cause the one or more processors to perform operations comprising:
obtaining loan transfer information of a user, the loan transfer information comprising a document specifying a loan transfer particular to the user;
causing a display of an augmented reality interface on a user device of the user, the augmented reality interface including a graphical marker for aligning the document with respect to a camera of the user device;
receiving, from the user device, a request for a user specific video that explains the loan transfer, wherein the request comprises a computer image of the document captured by the camera of the user device using the augmented reality interface;
in response to receiving the request, generating the user specific video using a rules engine, including:
selecting non-personalized content from a data store, at least some of the non-personalized content selected based on the loan transfer information;
analyzing the computer image of the document to determine at least a portion of the document coinciding with the graphical marker on the augmented reality interface;
generating personalized content based at least on the analysis of the computer image;
combining, to generate a plurality of scenes, the selected non-personalized content and the personalized content including generating at least one mandatory scene and generating at least one conditional scene that explains the portion of the document coinciding with the graphical marker on the augmented reality interface; and
generating the user specific video including the plurality of scenes;
causing a display of the document in real-time on the user device using the augmented reality interface, the display of the document including an image overlay comprising contextual information regarding the portion of the document coinciding with the graphical marker on the augmented reality interface; and
providing the user specific video to the user including causing a display of the user specified video on the user device.

7. The system of claim 6, wherein the document comprises at least one of a goodbye letter or a welcome letter.

8. The system of claim 6, wherein the generating of the at least one mandatory scene comprises generating a plurality of mandatory scenes, each scene combining at least some non-personalized content with at least some personalized content.

9. The system of claim 8, wherein the at least one mandatory scene of the plurality of mandatory scenes is generated based on a determination that the user is delinquent on their mortgage payments.

10. The system of claim 8, wherein at least one mandatory scene of the plurality of mandatory scenes comprises a call to action.

11. A non-transitory computer storage medium encoded with computer program instructions that when executed by one or more computers cause the one or more computers to perform operations comprising:
obtaining loan transfer information of a user, the loan transfer information comprising a document specifying a loan transfer particular to the user;
causing a display of an augmented reality interface on a user device of the user, the augmented reality interface including a graphical marker for aligning the document with respect to a camera of the user device;

receiving, from the user device, a request for a user specific video that explains the loan transfer, wherein the request comprises a computer image of the document captured by the camera of the user device using the augmented reality interface;

in response to receiving the request, generating the user specific video using a rules engine, including:

selecting non-personalized content from a data store, at least some of the non-personalized content selected based on the loan transfer information;

analyzing the computer image of the document to determine at least a portion of the document coinciding with the graphical marker on the augmented reality interface;

generating personalized content based at least on the analysis of the computer image;

combining, to generate a plurality of scenes, the selected non-personalized content and the personalized content including generating at least one mandatory scene and generating the at least one conditional scene that explains the portion of the document coinciding with the graphical marker on the augmented reality interface; and generating the user specific video including the plurality of scenes;

causing, by the computer system, a display of the document in real-time on the user device using the augmented reality interface, the display of the document including an image overlay comprising contextual information regarding the portion of the document coinciding with the graphical marker on the augmented reality interface; and providing the user specific video to the user including causing a display of the user specified video on the user device.

12. The non-transitory computer storage medium of claim 11, wherein the document comprises at least one of a goodbye letter or a welcome letter.

13. The non-transitory computer storage medium of claim 11, wherein the generating of the at least one mandatory scene comprises generating a plurality of mandatory scenes, each scene combining at least some non-personalized content with at least some personalized content.

14. The non-transitory computer storage medium of claim 13, wherein the at least one mandatory scene of the plurality of mandatory scenes is generated based on a determination that the user is delinquent on their mortgage payments.

15. The non-transitory computer storage medium of claim 13, wherein at least one mandatory scene of the plurality of mandatory scenes comprises a call to action.

* * * * *

UNITED STATES PATENT AND TRADEMARK OFFICE
CERTIFICATE OF CORRECTION

| | | |
|---|---|---|
| PATENT NO. | : 11,328,353 B1 | |
| APPLICATION NO. | : 15/345147 | |
| DATED | : May 10, 2022 | |
| INVENTOR(S) | : Carlos Winston Wilkinson and Scott Nathan | |

It is certified that error appears in the above-identified patent and that said Letters Patent is hereby corrected as shown below:

In the Claims

Column 9, Line 13, Claim 1, delete "fora" and insert -- for a --.

Signed and Sealed this
Twenty-fifth Day of October, 2022

*Katherine Kelly Vidal*

Katherine Kelly Vidal
*Director of the United States Patent and Trademark Office*